US008268031B2

(12) United States Patent
Andersson et al.

(10) Patent No.: US 8,268,031 B2
(45) Date of Patent: Sep. 18, 2012

(54) FABRIC FILTER SYSTEM

(75) Inventors: Rune Sten Andersson, Vaxjo (SE); Anders Erik Martin Hjelmberg, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 466 days.

(21) Appl. No.: 12/552,635

(22) Filed: Sep. 2, 2009

(65) Prior Publication Data

US 2010/0058722 A1    Mar. 11, 2010

Related U.S. Application Data

(60) Provisional application No. 61/095,965, filed on Sep. 11, 2008.

(51) Int. Cl.
*B01D 46/00*    (2006.01)
(52) U.S. Cl. .......... 55/415; 55/414; 55/416; 55/417; 55/418; 55/410; 55/DIG. 37; 96/399; 95/273
(58) Field of Classification Search .......... 55/414–418, 55/410, DIG. 37; 96/399; 95/273
See application file for complete search history.

(56) References Cited

U.S. PATENT DOCUMENTS

| | | | | |
|---|---|---|---|---|
| 2,189,895 A | * | 2/1940 | Grutzner | 237/2 A |
| 3,342,024 A | * | 9/1967 | Westlin | 55/443 |
| 3,409,283 A | | 11/1968 | Helm | |
| 3,425,334 A | * | 2/1969 | Brown et al. | 126/299 D |
| 3,500,738 A | * | 3/1970 | Wenig | 454/202 |
| 3,608,278 A | * | 9/1971 | Greenspan | 96/399 |
| 3,626,674 A | | 12/1971 | Blackmore | |
| 3,806,032 A | * | 4/1974 | Pries | 239/209 |
| 3,819,319 A | | 6/1974 | Schreter | |
| 3,849,091 A | | 11/1974 | Peterson | |
| 3,917,458 A | * | 11/1975 | Polak | 422/169 |
| 3,924,605 A | | 12/1975 | Weinman et al. | |
| 4,135,897 A | * | 1/1979 | Gondek | 55/404 |
| 4,255,176 A | * | 3/1981 | Macrow | 55/415 |
| 4,354,528 A | | 10/1982 | McAndrew | |
| 4,360,364 A | | 11/1982 | Kohl | |
| 4,373,940 A | * | 2/1983 | Petersen | 55/328 |
| 4,443,234 A | | 4/1984 | Carlsson | |
| 4,523,931 A | | 6/1985 | Miller et al. | |

(Continued)

FOREIGN PATENT DOCUMENTS

EP    0 422 740    4/1991

(Continued)

OTHER PUBLICATIONS

PCT International Search Report and The Written Opinion of the International Searching Authority dated Aug. 2, 2010—(PCT/IB2009/006805).

*Primary Examiner* — Jason M Greene
*Assistant Examiner* — Dung H Bui
(74) *Attorney, Agent, or Firm* — Rita D. Vacca

(57) ABSTRACT

The present disclosure relates to a fabric filter system, which may be used for removing particulate matter from a gas, such as a combustion process gas. The filter system includes a fabric filter (3) which is placed in a filter compartment. From the filter, gas flows via a filter plenary space (5) to an outlet duct (7), where the gas exits. A flow control device controls the amount of air exiting through the outlet duct. The flow control device comprises a louver-type damper (17). This provides reliable and efficient control of the gas flow. A collar (21), connecting the plenary space (5) with the outlet duct (7), improves the gas flow into the duct.

7 Claims, 3 Drawing Sheets

U.S. PATENT DOCUMENTS

| | | | |
|---|---|---|---|
| 4,610,849 | A | 9/1986 | Van Camp et al. |
| 4,655,804 | A | 4/1987 | Kercheval et al. |
| 4,668,489 | A | 5/1987 | Alexander et al. |
| 4,880,608 | A | 11/1989 | Stelman |
| 4,883,509 | A | 11/1989 | Giusti et al. |
| 6,257,155 | B1 | 7/2001 | Greene |
| 6,379,412 | B1 * | 4/2002 | Porterfield ............ 55/493 |
| 6,748,880 | B2 | 6/2004 | DeSellem |
| 7,291,194 | B2 | 11/2007 | Snyder |
| 2003/0041729 | A1 | 3/2003 | Finigan |
| 2004/0120864 | A1 | 6/2004 | Chung |
| 2004/0182052 | A1 | 9/2004 | Snyder |
| 2005/0204918 | A1 * | 9/2005 | Brown ............ 95/273 |
| 2006/0112825 | A1 * | 6/2006 | Renwart et al. ........ 95/273 |

FOREIGN PATENT DOCUMENTS

| | | |
|---|---|---|
| GB | 07550 | 0/1912 |
| GB | 281994 | 3/1928 |

* cited by examiner

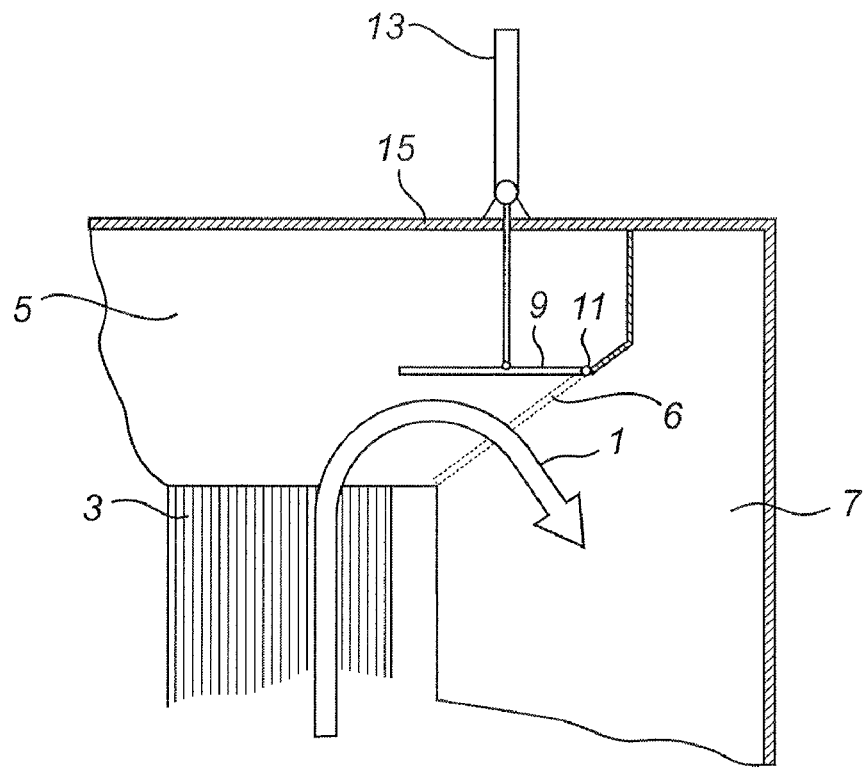
(Prior art) *Fig. 1*
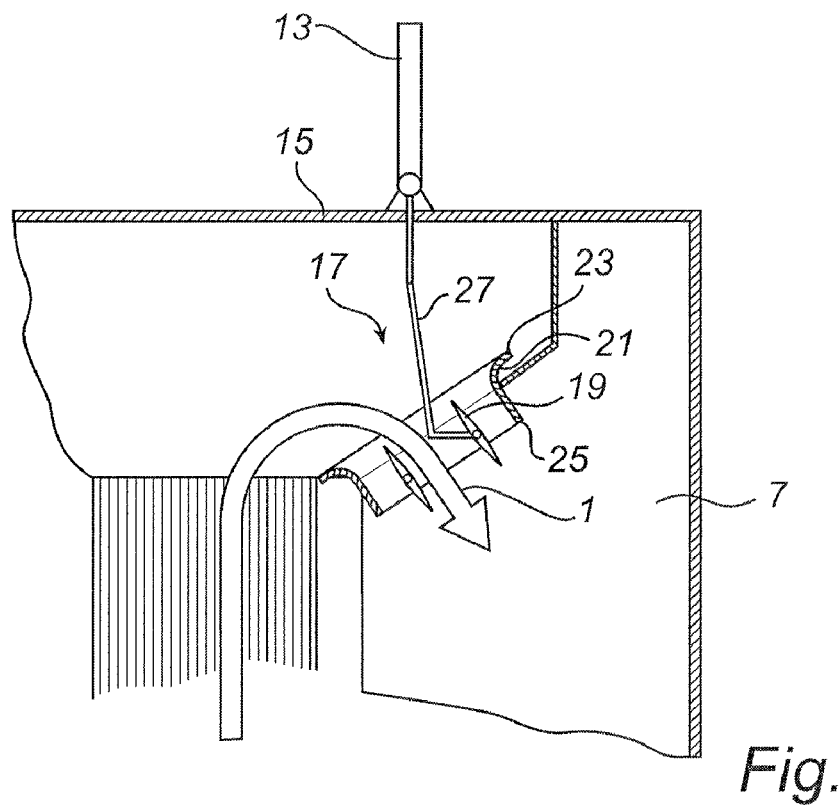
*Fig. 2*

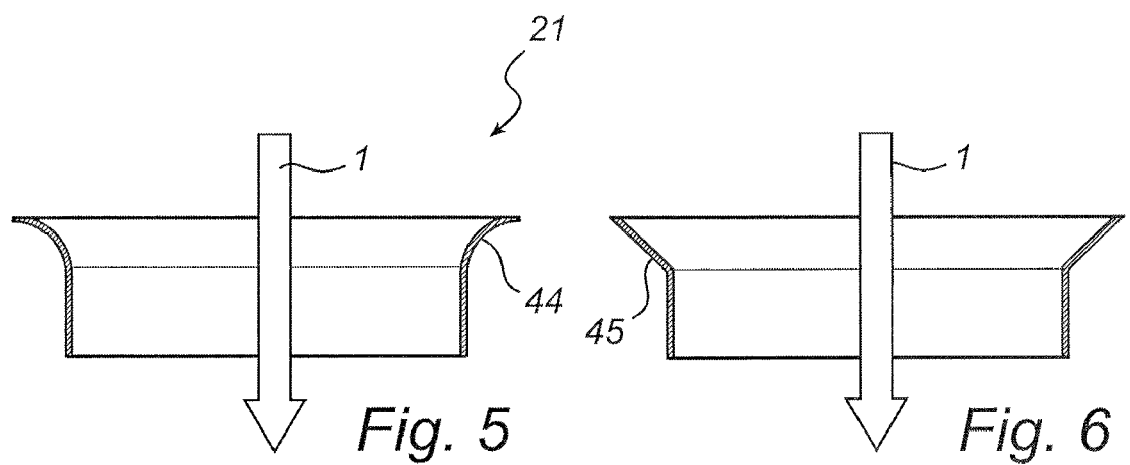
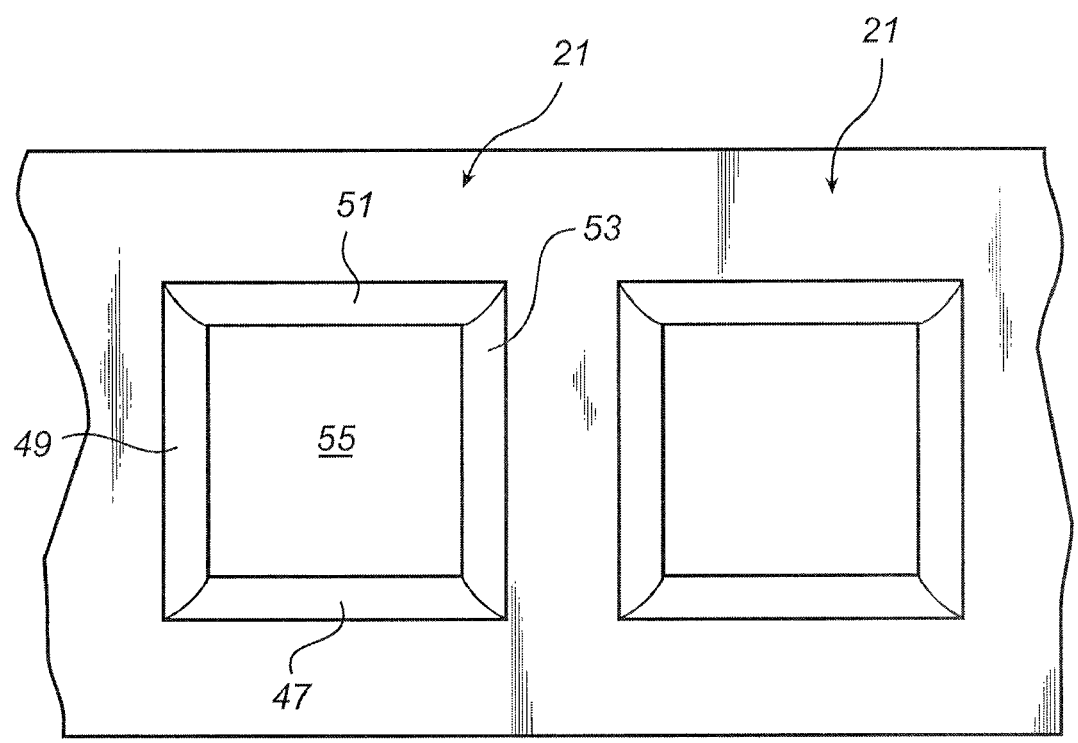

FABRIC FILTER SYSTEM

CROSS-REFERENCE TO RELATED APPLICATION

This application claims the benefit of U.S. Provisional Patent Application Ser. No. 61/095,965 filed Sep. 11, 2008, which is hereby incorporated by reference in its entirety.

FIELD OF THE INVENTION

The present disclosure relates to a fabric filter system, for removing particulate matter from a gas, comprising a fabric filter, a filter plenary space receiving gas from the fabric filter, an outlet duct, having an interior and through which gas can flow from the filter plenary space, and a flow control device for controlling the amount of gas exiting into the outlet duct.

BACKGROUND ART

A general example of a fabric filter system is disclosed e.g. in U.S. Pat. No. 4,336,035. Such a filter may comprise a plurality of filter bags which separate particulate matter from a gas flow. A typical application of such a filter system is to clean flue gases from a coal combustion process.

In some cases it is desired to substantially stop the gas flow through the filter system, e.g. in order to allow service staff to enter one filter system interior, while filtering is continued by other, parallel filter systems.

This may be provided by means of a flow control device of the initially mentioned kind which is then accomplished by means of a flap damper, which may be devised as a hinged door which is pivotably moveable between two positions, one where the opening to the duct is open, and one where the opening is covered by the door.

One problem associated with such a filter system is that the door may become difficult to operate, particularly if the cross section of the opening is large, such that a large door is to be used. A considerable force is needed e.g. to open the damper.

SUMMARY

One object of the present disclosure is therefore to provide a fabric filter system where the system's gas flow can be controlled more easily.

This object is achieved by means of a fabric filter as defined in the appended claim 1. More particularly a fabric filter system, for removing particulate matter from a gas then comprises a fabric filter, a filter plenary space receiving gas from the fabric filter, an outlet duct, having an interior and through which gas can flow from the filter compartment, and a flow control device for controlling the amount of gas exiting into the outlet duct, wherein the flow control device includes a louver-type damper.

Such a damper has shown to be far more efficient when a greater opening is needed, particularly as more than one wing may be provided, each wing covering a part of the opening. Each wing may be operated by rotation around a pivot point where the force needed to achieve the rotation is fairly independent of the pressure drop at the damper.

Further, a tapering collar, having one wide and one narrow end, may connect the outlet duct with the filter plenary space, the wide end being placed in the filter plenary space and the narrow end being placed in the interior of the outlet duct. Such a collar can improve gas flow at the duct opening, such that a smaller opening, and consequently a smaller damper, can be provided for a given gas flow and pressure loss. The wide end opening may present a smoothly curved surface to gas entering the outlet duct or may be funnel-shaped.

The collar may be rectangular as seen in the direction of the gas flow, thus being readily compatible with a rectangular louver-type damper.

The louver-type damper may controllable between an open and a closed position, and may further be controllable to be used in at least one intermediate position between the open and the closed position. This allows the damper to be used not only to shut the gas flow off, but also e.g. to balance the gas flow between parallel filter systems.

BRIEF DESCRIPTION OF THE DRAWINGS

FIG. 1 shows an outlet part of a fabric filter system according to prior art.

FIG. 2 shows a corresponding outlet part of a fabric filter system according to the present disclosure.

FIG. 5 shows a first duct opening collar design.

FIG. 6 shows a second duct opening collar design.

FIG. 7 shows a front view of two openings to a duct, being arranged side by side.

DETAILED DESCRIPTION

Figure 3:
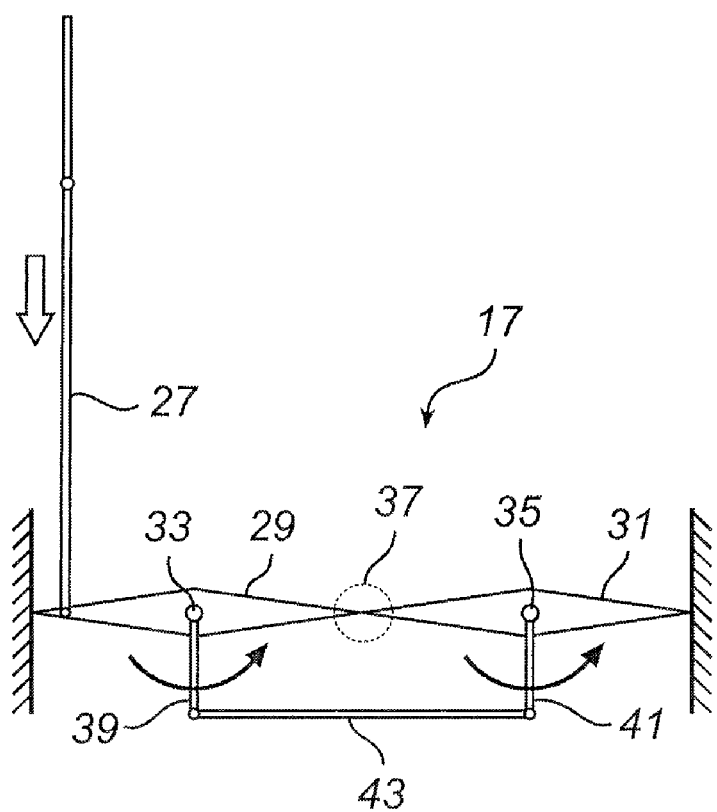
FIG. 3 shows a louver type damper in a closed position.

FIG. 1 shows an outlet part of a fabric filter system according to prior art. Fabric filters in general are well known to the skilled person, and will not be described in detail.

In general, particulate matter is removed from a gas stream 1 by means of a fabric filter 3 which may comprise a plurality of fabric bags or hoses. In a typical application, the filter system may be used to remove particles from a flue gas stream exiting a combustion chamber in a fossil fuel fired boiler. When exiting the fabric filter 3, the gas passes through a filter plenary space 5 or filter compartment on top of the filter 3. The plenary space is common to a plurality of filter bags. The gas then enters through an opening 6 to an outlet duct 7, which may be placed laterally with respect to the fabric filter 3 and the plenary space 5. A plurality of openings may be provided. The filter system comprises a flow control device in the form of a door-type flap damper 9 for each opening which is pivotably attached to a pivot 11. Thereby, the flap damper 9 can be moved between an open position (shown) where gas is allowed to enter the outlet duct 7 and a closed position (faintly outlined) where the flap damper 9 seals the opening to the outlet duct 7 from the plenary space 5 above the fabric filter 3, such that the gas flow 1 is substantially stopped. The flap damper 9 is then activated by means of an actuator 13 outside the duct wall 15 of the filter system. This allows e.g. service staff to safely enter the filter plenary space in order to carry out maintenance work.

As long as the fabric filter 3 is relatively small the arrangement of FIG. 1 does provide an efficient flow regulating solution. When a bigger fabric filter is considered however, a greater gas flow is at hand and the outlet duct opening/openings must be increased as well. This requires the use of larger flap dampers with a considerable area, which will need a great force to be actuated. This implies that flap dampers and their associated actuators will be expensive in larger fabric filter systems.

One alternative to flap dampers would be to use poppet type dampers which are moved parallel with the gas flow direction between a position where the opening to the duct is open and another where the opening is closed. Such dampers however experience the same problem when the size of the duct opening increases to handle a greater flow.

FIG. 2 shows a corresponding outlet part of a fabric filter system according to the present disclosure. This system includes a flow control device in the form of a louver-type damper 17, which is placed in the outlet duct. The louver type damper 17 comprises one or more wings 19 which are pivotably attached at a midpoint, such that they can be moved between an open position, where the wing 19 is more or less parallel with the gas flow 1 and a closed position which is perpendicular to the open position. The louver type damper 17 will be described in more detail with reference to FIGS. 3 and 4.

It is possible to use also intermediate positions between the closed and the opened positions to regulate the gas flow. This may be desirable, e.g. to balance the flow of two or more parallel filters. The damper may then be controlled continuously between the opened and closed positions.

A tapering collar 21 may be provided, having one wider 23 and one narrower 25 end. The collar connects the outlet duct 7 to the plenary space 5, the wide end 23 being placed in the plenary space 5 and the narrow end 25 being placed in the interior of the outlet duct 7. This collar 21 improves the gas flow profile, such that a smaller opening can be provided for a given pressure loss and a given gas velocity. With a smaller opening, a damper 17 with a smaller area can be used. The tapering collar will be discussed further with reference to FIGS. 5 and 6.

Similar to the solution described in FIG. 1, the louver type damper is controlled by means of an actuator 13 which is placed outside the wall 15 of the plenary space 5. A link 27 connects the actuator 13 with the damper 17.

FIG. 3 shows a louver type damper 17 in a closed position. The illustrated damper has two wings 29, 31, which are each pivotably mounted on a pivot axis 33, 35. The pivot axes preferably coincide with the mid points of the wings, such that the wing is balanced. This facilitates the rotation of the wing as the gas flow will not itself turn the wings.

Figure 4:
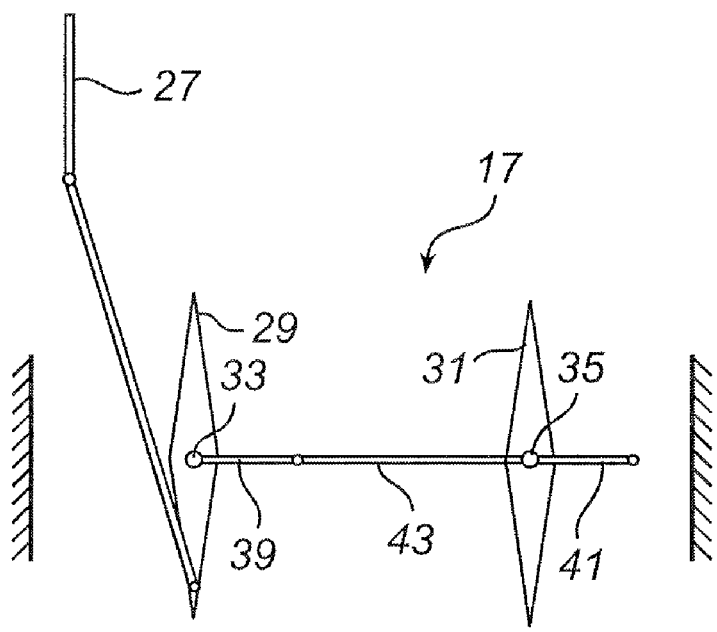
FIG. 4 shows a louver type damper in an open position.

The wings may be mounted such that there is an overlap in the area 37 where the wings meet in the closed position, thereby providing a sealing effect. This effect may be enhanced by means of different sealing devices, as is known in the art. The first wing 29 is controlled by an actuator (not shown) via a link 27, such that a linear motion in the direction of the arrow close to the link 27 forces the first wing 29 to rotate around its pivot axis, thereby allowing an increasing gas flow to pass into the outlet duct. Each of the wings 29, 31 may have a crank 39, 41 rigidly connected thereto close to the pivot axes and the distant ends of those cranks may be interconnected by means of a rod 43, such that the second wing 31 imitates the motion of the first wing 29. Thereby, the second wing 31 need not have its own actuator. Thus, by activating the link 27 as illustrated by the arrow in FIG. 3, it is possible to switch the louver type damper 17 into an open position as illustrated in FIG. 4. As mentioned, it is possible to use the damper 17 in positions that are intermediate to the open and closed positions. It is not necessary to control the wings in a parallel fashion. Another option is to allow the wings to operate in a counter-parallel fashion where the wings rotate in opposite directions. Yet another option is to control one wing at a time.

In FIGS. 3 and 4 a louver type damper 17 with two wings is shown. However, more than two wings may be used, and an embodiment with only one wing is also conceivable. The wings may be produced e.g. in steel.

FIG. 5 shows a first duct opening collar design 21 in cross section. This design presents a smoothly curved surface 44 to the gas flow 1 entering the outlet duct. Different bell mouth cross section curvatures are conceivable, e.g. one with a specific radius, or one resembling approximately an exponential function. This will smooth the gas flow and reduce the pressure loss at the outlet duct opening. However, also a funnel shaped collar 45 as illustrated in FIG. 6 will provide this effect, at least to some extent.

FIG. 7 shows a front view of two tapering collars 21 as seen in the direction of the entering gas flow. Normally, the collars will be rectangular, having four side portions 47, 49, 51, 53. This provides a rectangular narrower, inner end portion 55 where a louver type damper may readily be placed as discussed earlier.

In summary, the present disclosure relates to a fabric filter system, which may be used for removing particulate matter from a gas, such as a combustion process gas. The filter system includes a fabric filter which is placed in a filter compartment. From the filter, gas flows via a filter plenary space to an outlet duct, where the gas exits. A flow control device controls the amount of gas exiting through the outlet duct. The flow control device comprises a louver-type damper. This provides reliable and efficient control of the gas flow. A collar, connecting the plenary space with the outlet duct, improves gas flow into the duct.

The scope of the present disclosure is not limited by the above-described examples, only by the appended claims. For instance, even if the above example has been given in relation to combustion processes, a filter of the described kind may be used to remove any particular matter from any gas. Therefore, applications e.g. in ventilation systems may be considered.

The invention claimed is:

1. A fabric filter system, for removing particulate matter from a gas, comprising:
    a fabric filter,
    a filter plenary space, receiving gas from the fabric filter,
    an outlet duct including a tapering collar having an interior through which gas can flow from the filter plenary space,
    a flow control device positioned in said tapering collar for controlling the amount of gas exiting into the outlet duct, and
    the flow control device includes a louver-type damper adjustable to an open position, a closed position and at least one intermediary position there between.

2. A fabric filter system according to claim 1, wherein said tapering collar includes one wide end and one narrow end, with the wide end positioned in the filter plenary space and the narrow end positioned in the interior of the outlet duct.

3. A fabric filter system according to claim 1, wherein said tapering collar has a wide end forming a smoothly curved surface to gas entering the outlet duct.

4. A fabric filter system according to claim 1, wherein said tapering collar includes a wide funnel-shaped opening.

5. A fabric filter system according to claim 1, wherein said tapering collar is rectangular in shape when viewed in the direction of the gas flow.

6. A fabric filter system according to claim 1, wherein the louver-type damper comprises two or more wings controlled in parallel.

7. A fabric filter system according to claim 1, wherein the louver-type damper is controllable between an open and a closed position, and is further controllable to be used in at least one intermediate position between the open and the closed position to balance gas flow through said fabric filter system.

* * * * *